United States Patent Office 3,012,035
Patented Dec. 5, 1961

3,012,035
IONIC BROMINATION OF AROMATIC AND ALIPHATIC COMPOUNDS WITHOUT HBr FORMATION
William S. Knowles, Kirkwood, and Gerhard H. Alt, St. Louis, Mo., assignors to Monsanto Chemical Company, St. Louis, Mo., a corporation of Delaware
No Drawing. Filed Feb. 24, 1959, Ser. No. 794,850
14 Claims. (Cl. 260—256.4)

This invention relates to an improved process for ionically brominating by substitution aromatic and aliphatic compounds and derivatives thereof.

It is known in the art that an aromatic compound such as benzene may be readily brominated as follows:

$$C_6H_6 + Br_2 \rightarrow C_6H_5Br + HBr$$

However, from a commercial standpoint this reaction is objectionable since one-half of the expensive bromine reactant is lost as the by-product, hydrogen bromide.

Accordingly it is an object of this invention to brominate aromatic compounds whereby all of the bromine reactant is utilized in forming the desired bromine derivative of the aromatic compound.

A further object of this invention is to provide a more economical method of preparing brominated aromatic compounds.

A still further object of this invention is to provide a method of ionically brominating aromatic compounds without the formation of hydrogen bromide as a wasteful by-product.

Further objects of this invention will become apparent from a description of the novel process as hereinafter set forth.

It has now been discovered that any organic compound may be brominated if it has at least one reactive hydrogen, excepting (a) aliphatic and aromatic compounds which are brominated by a free radical mechanism such as the paraffins and (b) unsaturated aliphatic and alicyclic compounds, by using only half of the normally required molar quantity of bromine by means of an in situ process whereby a mixture of (a) the aliphatic or the aromatic compound, (b) bromine or a soluble bromine compound, and (c) chlorine are reacted. The foregoing reaction may be summarized by the following equation by way of example:

$$2RH + 2Br_2 \rightarrow 2RBr + 2HBr$$
$$2HBr + 1Cl_2 \rightarrow 1Br_2 + 2HCl$$
(1) $$\overline{2RH + Br_2 + Cl_2 \rightarrow 2RBr + 2HCl}$$

where R is the organic radical remaining after the reactive hydrogen (or hydrogens) has been removed from the organic compound as defined above. By way of example, in the case of benzene Equation 1 above becomes $$2C_6H_6 + Br_2 + Cl_2 \rightarrow 2C_6H_5Br + 2HCl$$

It will be readily apparent from the above equation that the bromine is fully utilized in preparing the desired bromobenzene without the appreciable formation of hydrogen bromide as an undesirable by-product. The significance of this reaction from the standpoint of economics will be readily appreciated when one compares the relative cost of chlorine with bromine which is of the order of 1 to 10. The new process of this invention applies to any aromatic or aliphatic compound capable of bromination such as the aldehydes, ketones, phenols, and the like.

Moreover, this invention does not contemplate bromination involving a free radical mechanism but only ionic bromination. Illustrative of this free radical mechanism would be the bromination of cyclic and acyclic paraffins, polyhalomethanes and non-nuclear bromination of saturated aliphatic side chains of aromatic compounds such as toluene. Moreover, addition bromination is not intended as in the reaction of bromine with alicyclic and aliphatic compounds such as propylene which may be brominated by simple addition.

In this connection by the expression organic compound having at least one reactive hydrogen atom is meant, in the case of alicyclic and acyclic hydrocarbon compounds, a hydrogen (or hydrogens) on a carbon adjacent to at least one activating group such as carbonyl, nitrile, nitro, sulphone, and sulphoxy; and, in the case of aromatic and heterocyclic compounds, a hydrogen (or hydrogens) on a carbon ortho or para to an electron releasing group such as hydroxyl, acylamino, alkyl, phenyl, other aryl, alkoxyl, and aryloxyl.

Additional details of the process of this invention are presented in the following examples which are given for purposes of illustration and not by way of limitation.

*Example 1.—2-bromo-2-phenylacetophenone*

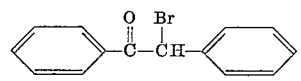

9.8 grams (0.05 mol) of 2-phenylacetophenone in 60 grams of glacial acetic acid are reacted with 4 grams (0.025 mol) of bromine added portion-wise over a period of 30 minutes at a temperature of 25° C. 1.8 grams (0.025 mol) of chlorine gas are then passed into the reaction mixture over a period of 45 minutes. The product is precipitated by the addition of 150 grams of water. The 2-bromo-2-phenylacetophenone obtained in good yield in this manner has a melting point of 50–53° C. and a chlorine content of 0.20%.

*Example 2.—4'-bromo acetanilide*

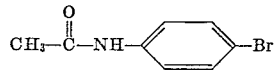

7.1 grams (0.1 mol) of chlorine gas are passed into a mixture of 13.5 grams (0.1 mol) of acetanilide and 10.3 grams (0.1 mol) of sodium bromide in 60 grams of glacial acetic acid and 15 grams of water over a period of 3 hours, during which time the temperature of the reaction mixture rises from 25 to 33° C. The product is precipitated by pouring the reaction mixture into 500 grams of water and isolated by filtration. The 4'-bromo acetanilide obtained in 86% yield in this manner melts at 163–167° C. and has a chlorine content of 0.7%.

*Example 3.—2-bromo-4,6-dichlorophenol*

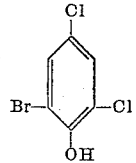

7.1 grams (0.1 mol) of chlorine gas are passed into a mixture of 16.3 grams (0.1 mol) of 3,4-dichlorophenol and 10.3 grams (0.1 mol) of sodium bromide in 50 grams of glacial acetic acid and 25 grams of water over a period of 2½ hours, during which time the temperature of the reaction mixture rises from 24–34° C. The product is precipitated by the addition of water and isolated by filtration. The 2-bromo-4,6-dichlorophenol obtained in excellent yield in this manner melts at 67–68° C. Analysis for halogen gives: bromine, 33.40%; chlorine, 29.36%; the halogen contents calculated for $C_6H_3BrCl_2O$ are bromine, 33.04%; chlorine, 29.32%.

Example 4.—3,5,4'-tribromosalicylanilide

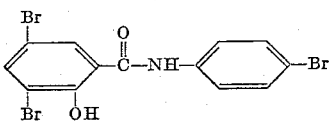

32 grams (0.45 mol) of chlorine gas are passed into a slurry of 32 grams (0.15 mol) of salicylanilide in a solution made from 49.5 grams (0.48 mol) of sodium bromide and 120 grams of water over a period of 5 hours, keeping the temperature at 90° C. The product is isolated by filtration after allowing the reaction mixture to cool. The 3,5,4'-tribromosalicylanilide is obtained in 97% of the theoretical amount and has a chlorine content of 0.12%.

Example 5.—3,5,4'-tribromosalicylanilide

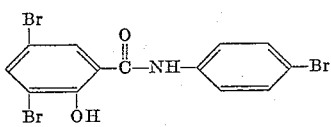

Alternatively 32 grams (0.15 mol) of salicylanilide suspended in a mixture of 95 grams of water and 15 grams of glacial acetic acid are treated with 36 grams (0.225 mol) of bromine dissolved in 20 grams of glacial acetic acid added portionwise over a period of 1 hour at a temperature of 50° C. 16 grams (0.225 mol) of chlorine gas are then passed into the reaction mixture over a period of 4 hours during which time the temperature of the reaction mixture rises to 60° C. The product is isolated by filtration after allowing the reaction mixture to cool. The 3,5,4'-tribromosalicylanilide is obtained in 98% yield and has a chlorine content of 0.11%.

Example 6.—2-bromo-p-xylene

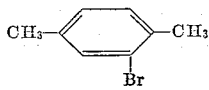

53 grams (0.5 mol) of p-xylene in 60 grams of glacial acetic acid containing 0.5 grams of ferric chloride as catalyst are treated with 40 grams (0.25 mol) of bromine added portionwise over a period of 3 hours at 60° C. 17.8 grams (0.25 mol) of chlorine are then passed into the reaction mixture over a period of 4 hours at a temperature of 55° C. The reaction mixture is allowed to cool, diluted with water and the product separated. The product is washed with water until neutral, dried with anhydrous magnesium sulphate and fractionated by distillation. The 2-bromo-p-xylene is obtained in good yield and has a boiling range of 100–110° C. at a pressure of 27 millimeters of mercury. The chlorine content is 1.65%.

Additional examples of compounds which may be brominated by this procedure are:

Amides, e.g. acetoacetanilide, propionanilide, and succinimide.
Aldehydes, e.g. acetaldehyde, isobutyraldehyde, and phenylacetaldehyde.
Acids, e.g. α-phenylpropionic acid, diphenylacetic acid.
Esters, e.g. alkyl esters of malonic, acetoacetic, benzoylacetic and salicylic acids.
Ethers, e.g. anisole, phenetole, diphenyl ether, di-α-naphthyl ether, di-β-naphthyl ether, methyl naphthyl ether.
Heterocyclics, e.g. barbituric acids, indigo, 1,3-dimethyl-4-aminouracil.
Hydrocarbons, e.g. toluene, ethyl benzene, mesitylene, naphthalenes, phenanthrenes, biphenyls, triphenyl methane.
Ketones, e.g. nitroacetophenones, acetone, camphor, cyclohexanone, cholestanone, acetonylacetone, methylethyl ketone.
Nitriles, e.g. alkyl esters of cyanoacetic acid.
Phenols, e.g. phenol, naphthols, bisphenol A, resorcinol, fluorescein.
Sulphones and sulfoxides, e.g. phenylbenzylsulphone, phenylbenzylsulphoxide.
Nitro compounds, e.g. nitromethane, nitroethane, dinitromethane.

In general it can be stated that the method of this invention involves the reaction in a liquid phase of any aromatic or aliphatic compound having at least one reactive hydrogen with chlorine and a source of bromine. Usually this liquid phase is obtained by using a solvent but under certain circumstances the solvent may be dispensed with where the organic compound being brominated such as phenol, may also serve as the solvent. Where the compound to be brominated is a solid and is also to serve as the solvent, it will be apparent to one skilled in the art that it will be necessary to fuse the compound in order to attain the liquid phase. The temperature at which the reaction is conducted will depend upon the reactivity of the aromatic or aliphatic compound employed. Accordingly this reaction may under some circumstances take place at room temperatures and in other instances at temperatures of 90° C. and higher. With regard to the source of bromine it is obvious that for economic reasons elemental $Br_2$, HBr, NaBr, KBr and $CaBr_2$ will be preferred. With the single exception of the elemental $Br_2$, all of these sources are soluble in water to at least 10% at the reaction temperature. Other bromine salts having such a solubility include inorganics such as $NH_4Br$, $BaBr_2$, $CdBr_2$, LiBr, $MgBr_2$, $MnBr_2$, $NiBr_2$ and $ZnBr_2$, and organics such as pyridine hydrobromide and trimethyl ammonium bromide. However this reaction is so comprehensive in its nature that any soluble inorganic or organic bromine salt may be effectively used. In general polar compounds such as water and glacial acetic acid are preferred as solvents. It is apparent that a very large number of bromine salts would be effective in the ionic bromination reaction of this invention and only relatively few insoluble bromine salts such as AgBr, HgBr, $PbBr_2$ would not be useable. However, even $PbBr_2$ would be operable if the reaction temperature were maintained around 100° C.

While this invention has been described with respect to certain embodiments, it is to be understood that it is not so limited in that variations and modifications thereof obvious to those skilled in the art may be made without departing from the spirit or scope of the invention.

What is claimed is:

1. In a process for ionic, liquid phase bromination by substitution which comprises contacting an organic compound having at least one reactive hydrogen thereon with a mixture of substantially equimolar amounts of chlorine and bromine, said compound being selected from the class consisting of alicyclic and acyclic compounds wherein said hydrogen is on a carbon atom adjacent to at least one activating group selected from the class consisting of carbonyl, nitrile, nitro, sulphone and sulphoxy, the improvement which comprises carrying out said process in an aqueous medium.

2. A process as defined in claim 1 wherein the source of bromine is elemental bromine.

3. A process as defined in claim 1 wherein the source of bromine is hydrogen bromide.

4. A process as defined in claim 1 wherein the source of bromine is potassium bromide.

5. A process as defined in claim 1 wherein the source of bromine is sodium bromide.

6. A process as defined in claim 1 wherein the source of bromine is calcium bromide.

7. A process as defined in claim 1 wherein the reaction is carried out at from room temperature to about 100° C.

8. In a process for ionic, liquid phase bromination by substitution which comprises contacting an organic compound having at least one reactive hydrogen thereon with a mixture of substantially equimolar amounts of chlorine and bromine, said compound being selected from the class consisting of aromatic and heterocyclic compounds wherein said hydrogen is on a carbon atom which is other than meta to an electron releasing group selected from the class consisting of hydroxyl, acylamino, alkyl, aryl, alkoxyl and aryloxyl, the improvement which comprises carrying out said process in an aqueous medium.

9. A process as defined in claim 8 wherein the source of bromine is elemental bromine.

10. A process as defined in claim 8 wherein the source of bromine is hydrogen bromide.

11. A process as defined in claim 8 wherein the source of bromine is potassium bromide.

12. A process as defined in claim 8 wherein the source of bromine is sodium bromide.

13. A process as defined in claim 8 wherein the source of bromine is calcium bromide.

14. A process as defined in claim 8 wherein the reaction is carried out at from room temperature to about 100° C.

References Cited in the file of this patent

UNITED STATES PATENTS

| | | |
|---|---|---|
| 2,355,410 | Bergel | Aug. 8, 1944 |
| 2,394,268 | Spencer | Feb. 5, 1946 |
| 2,535,131 | Gubelmann | Dec. 26, 1950 |
| 2,607,802 | Britton et al. | Aug. 19, 1952 |
| 2,640,064 | Speier | May 26, 1953 |

OTHER REFERENCES

Stark: "Berichte," vol. 43, pages 670–674 (1910).

Steinopf: "Annalen der Chemie," vol. 430, pages 41–78 (1922).

Bradfield et al.: "Journal of the Chemical Society," Part I, pages 1006–1012 (1928).

Bradfield et al.: "Journal of the Chemical Society" (London), Part II, pages 2810–2817 (1929).

Shilov et al.: "Chemical Abstracts," vol. 34, page 4062 (1940).

Robertson et al.: "Journal of the Chemical Society" (London), pages 276–279 (1943).

Golding et al.: "Journal Organic Chemistry," vol 12, pages 293–294 (1947).

Kosolapoff: "Journal of the American Chemical Society," vol. 75, pages 3596–3597 (1953).